(12) United States Patent
Willberg et al.

(10) Patent No.: US 6,820,694 B2
(45) Date of Patent: Nov. 23, 2004

(54) METHOD FOR PREPARING IMPROVED HIGH TEMPERATURE FRACTURING FLUIDS

(75) Inventors: Dean Willberg, Sugar Land, TX (US); Michaela Nagl, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 130 days.

(21) Appl. No.: 10/192,046

(22) Filed: Jul. 10, 2002

(65) Prior Publication Data

US 2003/0196809 A1 Oct. 23, 2003

Related U.S. Application Data

(60) Provisional application No. 60/374,696, filed on Apr. 23, 2002.

(51) Int. Cl.[7] .............................................. E21B 31/00
(52) U.S. Cl. .................... 166/308.5; 507/903; 507/922
(58) Field of Search .......................... 166/308.5, 280.2; 507/903, 922, 271, 211, 212

(56) References Cited

U.S. PATENT DOCUMENTS

| | | | |
|---|---|---|---|
| 4,369,124 A | 1/1983 | Elphingstone | 252/316 |
| 4,609,479 A | 9/1986 | Smeltz | 252/8.551 |
| 4,635,727 A * | 1/1987 | Anderson et al. | 166/308.5 |
| 5,007,481 A | 4/1991 | Williams | 166/300 |
| 5,478,802 A | 12/1995 | Moradi-Araghi | 507/203 |
| 5,591,700 A * | 1/1997 | Harris et al. | 507/214 |
| 5,957,203 A * | 9/1999 | Hutchins et al. | 166/295 |
| 5,981,446 A * | 11/1999 | Qiu et al. | 507/209 |
| 6,046,140 A * | 4/2000 | Woo et al. | 507/204 |
| 6,342,467 B1 * | 1/2002 | Chang et al. | 507/110 |
| 6,605,570 B2 * | 8/2003 | Miller et al. | 507/211 |
| 6,613,720 B1 * | 9/2003 | Feraud et al. | 507/200 |

* cited by examiner

*Primary Examiner*—William Neuder
(74) *Attorney, Agent, or Firm*—Stephen Schlather; Robin Nava

(57) ABSTRACT

The present invention related to a method for fracturing subterranean formations including the steps of (a) providing a water source; (b) adding a crosslinking agent to said water source; (c) adding a polymeric component to said water source to create a fracturing fluid; (d) pumping said fracturing fluid into said formation. The fluid may contain an acrylamide-acrylate copolymer and any suitable number of additives. The additives are preferably combined with the water source to form an additive stream, to which the polymer is later added.

25 Claims, 6 Drawing Sheets

METHOD FOR PREPARING IMPROVED HIGH TEMPERATURE FRACTURING FLUIDS

This application claims the benefit of Provisional Application No. 60/374,696 filed Apr. 23, 2002.

BACKGROUND

1. Field of the Invention

The present invention relates generally to a method for forming a fracturing fluid and a method for fracturing subterranean formations. More specifically, the invention relates to a method for fracturing oil, gas and/or water bearing formations using a novel method of preparing a suitable fracturing fluid.

2. Description of the Prior Art

Fluids based on crosslinked polymer solutions are commonly used to create hydraulic fractures in subterranean formations. Typically a solution of the polymer is made in the mix water, a crosslinking agent is added to the fluid along with any pH buffers, activators, or delay agents required for the specific job. This fluid is subsequently pumped down a wellbore.

In practice one of the most difficult steps in the preparation of a fracturing fluid is the dispersion and hydration of the polymer in the mix water. A dry polymer powder, a liquid emulsion, or a liquid suspension of the polymer in a carrier fluid, is added to the mix water in a high shear environment—such as in a centrifugal pump, or in a high-speed blender. The high shear is required to rapidly disperse the polymer throughout the mix water—and to assist in the stripping off any hydrophobic oils or surfactants that are stuck to the polymer particles surface. If the dispersion is incomplete, clumps of partially hydrated materials can form (commonly referred to as "fish-eyes") and seriously impede the full development of viscosity. Large fish eyes can cause plugging problems in the process stream and potentially damage fracture conductivity.

Once the polymer is dispersed, the hydrophilic polymer slowly unravels until it is fully hydrated (i.e., it reaches an equilibrium solvation which is determined by the particular polymer concentration and polymer properties, fluid pH, fluid ionic strength, etc.). The kinetics of hydration are typically slow—on the order of many minutes—and also depend significantly on the temperature, particular chemical composition, ionic strength and pH of the mix water. As the polymer hydrates the fluid builds viscosity. In general it is best that the polymer is fully hydrated, or close to full hydration, prior to the addition of crosslinkers and/or crosslinker activators. If the polymer crosslinks prior to full hydration the overall performance of the fluid is significantly reduced. Operational procedures, equipment design and the order of addition of chemical components must accommodate the relatively slow kinetics of polymer hydration—especially when continuous mix procedures are being followed. In order to accommodate the relatively slow polymer hydration kinetics, fluid blenders and work tanks with large volumes (150–300 bbl) are used to hydrate the gel. This requirement increases the equipment requirements of a hydraulic fracturing treatment. Furthermore, if the treatment is not pumped to completion—the left over fluid in the hydration unit becomes a disposal problem.

Additives that have limited impact on polymer hydration, such as biocides clay stabilizers, and temperature stabilizers, may be added to the mix water prior to the addition of the polymer. Sometimes pH buffers or modifiers (usually on the mildly acidic side) may be added to accelerate the rate of polymer hydration. However, with previous polymeric fluid systems, additives such as crosslinkers and crosslink activators are not added prior to polymer hydration or partial hydration or they are added in an inactive state, such as boric acid.

FIG. 1 shows a schematic of the equipment required for performing continuous mix hydraulic fracturing treatments. In these treatments large volumes of fluid (~100–20,000 bbl) are pumped at rates up to 100 bbl/min. Typical rates are in the range of 10–50 bbl/min (420–2100 gal/min). The triplex pumps used in hydraulic fracturing treatments can generate extremely high discharge pressures, but are not very efficient in suction—that is they have a net positive suction head requirement when pumping at high rates. Therefore, the triplex pumps have to be primed with fluid prior to a treatment, and it is critical that prime be maintained throughout a treatment (i.e., there is no interruption in fluid flow). If a pump looses prime, it can be extremely difficult to bring it back on line in order to successfully complete the treatment. If many or all pumps loose prime—it can mean the early termination of the treatment.

Centrifugal pumps and/or blenders that act as pumps are used to prime the triplex pumps during a treatment. Usually they develop less than 200 psi on their discharge sides (60–100 psi is typical) to feed the triplex pumps. Although somewhat better at suction then the triplex pumps, these pumps are fed primarily by gravity from the water storage tanks on location (occasionally booster pumps and/or head tanks are added in line to assist in moving fluid and keeping the prime of the blender).

Therefore, flow assurance throughout the surface equipment is critical during hydraulic fracture execution. Any interruption of fluid transfer during execution, anywhere in the system, can and often results in early and unsuccessful termination of a fracturing treatment. Flow assurance problems are exacerbated when the fluids have high shear and/or extensional viscosities, or if by their physical properties they are difficult for the pumps to handle. Hydrated polyacrylamide solutions at concentrations greater than 10 lbm/1000 gal active polymer weight are an example. These fluids have very high extensional viscosities, which makes them difficult to pump with conventional surface equipment such as centrifugal pumps, vortex pumps, and blenders.

The primary criteria for designing and formulating fracturing fluids are set by the physical properties of the formation. The temperature, permeability, fluid saturations, salinity, mineralogy, and mechanical properties of the rock in the target formation are prime considerations when selecting or formulating a fracturing fluid for a given treatment. For example, most fluids are selected to have sufficient viscosity to transport proppant and create fracture width for a time equal to or greater than the duration of the treatment. Considerations related to flow assurance—ease of mixing and compatibility with equipment—are usually of secondary importance. That is, when faced with a choice, blending, pumping equipment, or operational procedures are modified to handle the fluid. The more demanding the bottom hole conditions—the less flexibility there is in optimizing the ease of well site delivery of the fluid. Fluids designed for formations with bottom hole static temperatures (BHST) in excess of 300° F. are especially challenging with respect to flow assurance. These fluids typically have high polymer loadings (in excess of 20 lbm/1000 gal), pH buffering packages and added high temperature stabilizers in order to maintain viscosity at these high temperatures.

SUMMARY OF THE INVENTION

The present invention describes a method for preparing a fracturing fluid, which method may be used to continuously mix fluids that meet the requirements for use high temperature formations, while at the same time significantly improving the flow assurance during the well site delivery. In this method the polymer is added to a fluid stream and hydrated subsequent to or simultaneously with other additives, which may be present in the fluid stream. The fluids prepared by this method have excellent performance and problems associated with flow assurance are minimized.

Initially, a water stream is provided as the basis for the fluid. Any suitable water source may be used in conjunction with the present invention. The specific type of water required, such as brackish water or "city" or municipal water, is determined by the specific type and characteristics of the fluid being prepared. For example, the salt content of the water may affect the rheologic characteristics of the fluid. Therefore, the water source should be compatible with the desired characteristics of the fracturing fluid. Additives may be used to alter or modify the water stream to obtain a suitable fluid from an otherwise unacceptable water source.

A number of additives or other fluid modifiers may then be added to or mixed with the water stream in order to adjust or modify the characteristics of the fluid, as needed. For instance, surfactants, fluid loss additives, biocides, crosslinkers and proppants, among others, may be incorporated into the water stream prior to the addition of the polymer. The specific properties of these additives may have varying effects on the final fluid and are typically chosen to obtain a fluid having specific, desired properties. In certain instances, the order of addition of the additives may affect the characteristics of the fracturing fluid. Therefore, it may be necessary to incorporate such additives in a specific or preferential order to obtain a fluid with the desired properties. It may also be desirable to include or incorporate any number of these additives simultaneously with the addition of the polymer.

One aspect of the present invention that facilitates the addition of additives to the water stream (as opposed to the prior art, which requires hydration of the polymer prior to the addition of other materials) is the use of an acrylamide based polymer. Typically, these polymers are capable of relatively rapid hydration, depending on the particular surfactants being used. In certain cases, the polymer may be suitably hydrated in only a few seconds to a few minutes, as opposed to guar-based polymers which may take as long as 30 minutes to suitably hydrate. This rapid hydration ability allows for, among other things, a reduced amount of equipment at the job site, because a hydration tank and associated mixing equipment is no longer required. The hydration rate of these polymers may be affected by surfactants, which may further accelerate hydration. Acrylamide based polymers may be hydrated "on the fly" or in a continuous type process; therefore, the time required to "pre-hydrate" the polymer is eliminated. In addition, the fluid will initially have a lower viscosity, until the polymer has completely hydrated and/or crosslinked. Therefore, when pumping the fluid downhole, a higher rate may be used because the viscosity of the fluid will be decreased, as compared to the viscosity of the fully hydrated polymer under similar conditions. Furthermore, in the case of ealy termination of a treatment, the total volume of material requiring waste disposal is minimized.

In order to prevent an undesired rate of crosslinking in the fluid, it may be beneficial to use a crosslinking delay agent or a crosslinker having delayed activity. Since the present invention preferably incorporates the crosslinker in the water stream prior to the addition of the polymer, the crosslinker or crosslinker and delay agent combination, is preferably chosen so that the rate of crosslinking reaction(s) is slower than the rate of polymer hydration. In addition, it may be desirable to choose a crosslinker that is stable in high dilution and in the presence of other additives. Certain crosslinkers useful in the present invention may reach their peak activity only after the fluid reaches a certain temperature. For instance, titanium lactic acid crosslinkers do not show significant crosslinking activity until they reach approximately 120° F. when the fluid is at pH=6.5 or greater. It is sometimes desirable to delay crosslinking because the uncrosslinked fluid is less viscous and, therefore, more easily pumped and handled at the surface and exhibit less friction pressure as they are pumped down the wellbore. Therefore, when pumping the fluid downhole, a higher rate may be used because the viscosity of the fluid will be decreased, as compared to the viscosity of the fully hydrated polymer under similar conditions. In addition, uncrosslinked fluids typically experience less shear damage as they are pumped through the various fracturing equipment or the wellbore and perforations.

Another mechanism for delaying crosslinking is to include an additional crosslinking delay agent or agents. This agent or agents may be any suitable compounds or substances that are capable of delaying the activity of the crosslinker for a certain period of time. The specific period of delay varies, depending on the type of fluid and the specific parameters of the job being performed. For example, where the downhole temperature is greater, a longer delay is typically desired. The crosslinking delay agent may be added to directly to the water source, or it may be pre-mixed with the crosslinker. Crosslinking delay agents useful in the present invention include citric acid, acetic acid, salicylate and tartaric acid.

The fluid created using the present method is an acrylamide-based fluid having improved high temperature stability and reduced pH, as compared to commonly known guar-based fluids. The fluid has a reduced initial viscosity due, in part, to the late addition of the polymer emulsion at the blender. Typically, as the polymer hydrates, the fluid becomes more viscous. Since, in the present invention, the polymer is not pre-hydrated the fluid remains in a less viscous state as it is handled on the surface, particularly with regard to handling or processing prior to or by the blending equipment. Since the fluid being pumped throughout the backside has a low viscosity—for the most part, that of water—flow assurance problems that could be created by the pumping of highly viscous polymer solutions through blenders and centrifugal pumps are avoided.

The advantage of this method are apparent when used in conjunction with operational-scale blending equipment. An experiment was conducted, wherein the ability of a Precision Optimal Density (POD) blender to handle fully hydrated polyacrylamide solutions was examined. The POD blender is a device that functions in an analogous fashion to a centrifugal or vortex pump and is powered by a hydraulic motor. The test plan called for the POD to suck hydrated gel out of one tank and discharge it into a second, empty tank. However, during the test it was discovered that it was extremely difficult for the POD to suck hydrated gel from a tank—either through 4 in or 8 in hoses—and maintain adequate discharge pressures and rates for an actual fracturing treatment. In one test a 30 bbl holding tank was filled with hydrated 40 lbm/1000 gal polyacrylamide/polyacrylate copolymer. Feeding the blender through an 8 in line from this tank—at a rate of only 3 BPM the discharge pressure was 45 psi, while the hydraulic pressure was 3000 psi. In contrast, under normal operations the POD blender typically generates a discharge pressure of 80–90 psi, at rates as high as 20 bbl/min at the same hydraulic pressure. Due to the reduced efficiency of the POD blender in pumping fully hydrated fluid, the flow assurance during a fracturing treatment would be compromised if the polymer had to be hydrated before addition of the crosslinker package.

Additional advantages provided by this invention, include less required equipment at the jobsite, less required pumping power and reduced shear damage to the fluid. Additionally, the delayed action of the preferred crosslinkers further aids in maintaining a reduced viscosity until the fluid is pumped into the wellbore and in most fracturing applications until the fluid has passed the perforations and entered the formation. As the fluid travels down the wellbore, the viscosity will increase initially, as the polymer hydrates and crosslinks. Typically, as the temperature increases in the fracture, the fluid will begin to lose viscosity.

In one embodiment of the invention, a proppant may be included in the fluid. Any suitable proppant may be used, however, resin coated proppants are particularly preferred. Resin coated proppant (RCP) may be included in the water stream prior to addition of the polymer. The relatively neutral pH of the fluid, as compared to conventional high temperature fracturing fluids, provides a less damaging environment for the RCP as it is pumped downhole. This provides a two fold benefit in that the coating maintains a greater thickness as it travels downhole and the amount of coating material that is eroded is decreases, therefore, less coating material is dispersed in the fluid.

In yet another embodiment, the present invention may further incorporate or be used in conjunction with fibers. Typically, the fibers are added substantially simultaneously with the proppant, immediately prior to pumping the fluid downhole, but may be added at any suitable point in the mixing process. Fibers are particularly preferred in conjunction with proppant. Any suitable fibers may be used in the fluid. Preferably, the fibers are essentially inert and do not interact chemically with the fluid. Both organic and inorganic fibrous materials are useful in the present invention.

DETAILED DESCRIPTION OF THE PREFERRED EMBODIMENTS

Figure 1:
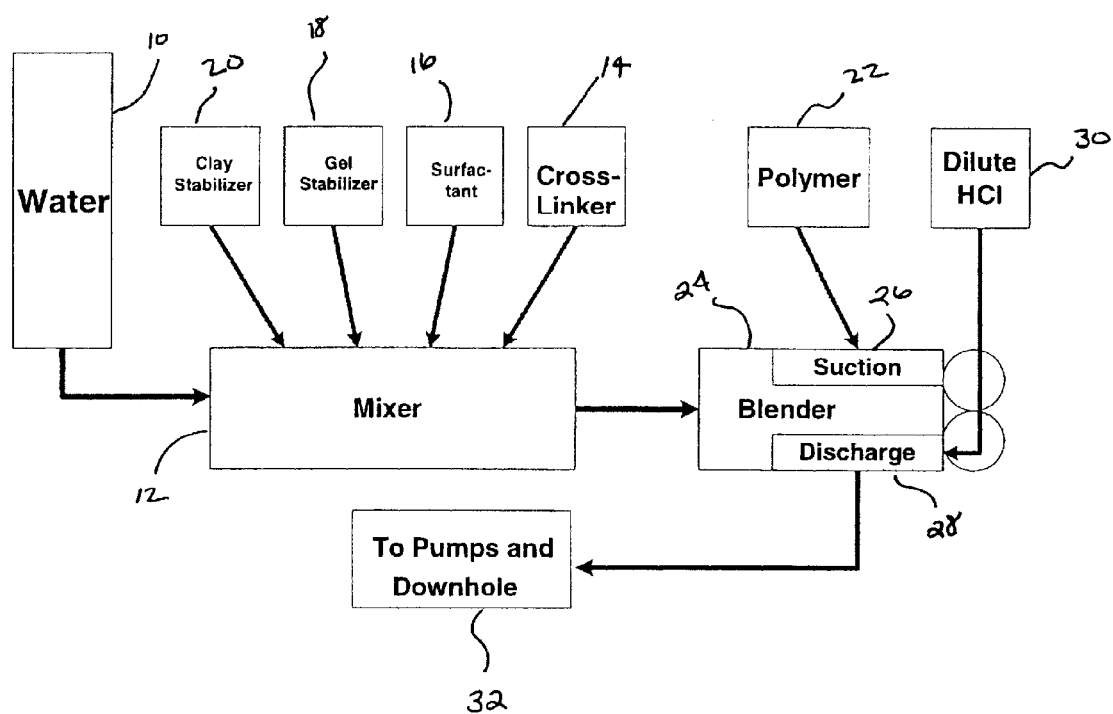
FIG. 1 is a diagram showing a preferred equipment arrangement for preparing a fracturing fluid.

FIG. 1 shows a schematic of a typical jobsite arrangement for preparing a fracturing fluid in accordance with the present invention. A suitable water stream 10 is provided to mixer 12. The water stream may be of any suitable source or nature, but preferably has a reduced calcium and magnesium ion content. Where a suitable water source is not available, the water may be treated on or off the location in order to make it suitable for this fluid system.

Once the water stream has been passed to the liquid additive unit, a number of additional additives may be mixed with or included in the water to form a liquid additive stream. For instance, a suitable crosslinker 14 is preferably included in the additive stream. Titanium and zirconium compounds are the preferred crosslinkers in the present invention, although any suitable crosslinker may be used. Most preferably, the crosslinker is an organic titanate and is selected from titanium lactic acid (TiLA) complexes, various titanium acetylacetonates (TiAAs) or complexes of titanium with any of the following ligands: citrate, di-, tri- or tetra-valent liquids with oxygen as the active binding site. The oxygen binding site may be alcoholate or part of another functional group, such as a carboxylate or phosphate. The crosslinker may be added directly to the water stream and typically does not require dissolution or mixing with solvent. While any suitable amount of crosslinker may be included in the additive stream, concentrations of between 0.25 gal/1000 gal and 10 gal/1000 gal are preferred.

A suitable surfactant 16 may also be included in the additive stream. The surfactant typically aids in the hydration of the polymer, effectively decreasing the hydration time. The concentration of surfactant may therefore be used to control the hydration time of the polymer. The addition of an acidic activator before the polymer is sufficiently hydrated may prevent the fluid from developing full viscosity. The addition of a surfactant may be necessary to ensure that the polymer is sufficiently hydrated before the addition of an acidic activator. Any suitable surfactant may be used. Preferably, a nonionic surfactant such as ethoxylated alcohols will be used. Preferably, the surfactant should not interfere with the crosslinker chemistry.

Any number of additional additives may be included in the additive stream prior to the addition of the polymer. A clay stabilizer 20 may be included where the formation conditions make such an additive desirable. Clay stabilizers may include, but are not limited to, potassium chloride and tetramethylammonium chloride (TMAC). Similarly, a gel stabilizer 18 may be included when the fluid is expected to reach temperatures exceed approximately 300° F. during the treatment. Sodium thiosulfate is a preferred gel stabilizer.

Although any suitable functionalized polymer may be used in the present invention, a preferred polymer has approximately 50 wt % to 90 wt % acrylamide and approximately 10 wt % to 50 wt % acrylate. In a more preferred embodiment, the polymer will contain approximately 60 wt % to 78 wt % acrylamide and approximately 22 wt % to 40 wt % acrylate. Any suitable acrylate may be used, such as potassium or ammonium acrylate; however, in a most preferred embodiment, the acrylate is sodium acrylate.

After the various additives have been included with or mixed with the water stream to form an additive stream, the additive stream is passed to a blender 24, where the stream is mixed or combined with polymer 22 to form a fracturing fluid. Preferably, the polymer will be added to the suction side of the blender, although any suitable addition point may be used. Proppant can also be added at the blender. The fracturing fluid is then passed from the blender to the pumping equipment 32 to be pumped downhole.

In certain applications, it may be desirable to include or incorporate crosslinking activators into the fluid. Typically, crosslinking activators operate by lowering the pH of the fluid, and in a preferred embodiment, the crosslinking activator is an acid. The acid may serve a number of purposes in the fluid. For instance, it may lower the crosslinking temperature by 5°–40° F. It may also be used to overcome certain water quality issues or to increase the initial viscosity of the fluid. Preferably, acid is added to the fluid after the polymer has been added to the additive stream and partially hydrated. Any suitable acid may be used; however, chelating acids and oxidizing acids are preferred. Hydrochloric acid is most preferable.

The following examples are illustrative of the fracturing fluids of the present invention: The fracturing fluid samples used in the examples were prepared by first combining the additives with a suitable water source. An initial amount of water is measured into a suitable container, preferably a plastic beaker or similar container. The container is then placed under a suitable mixer or stirrer (but preferably not a Wearing blender). The additives are then added to or combined with the water based on concentration. Concentration is typically measured in gallons per thousand gallons (lbm/1000 gal). For instance, clay stabilizer is preferably added to the water at a concentration of 0.5 and 2 gal/1000 gal. Any number of additives may be included. In certain cases, the additives may be added in a preferential order to obtain the best results. Once the additives have been mixed into the water to form an additive mixture, the polymer may be added to or combined with the mixture. Once the polymer is sufficiently hydrated, samples are taken for evaluation. Typically, the polymer will reach 90% hydration in less than 20 seconds.

EXAMPLE 1

20# Fluid

The following additives were combined with water, at the indicated concentrations:

| Additive | Concentration (lbm/1000 gal) |
|---|---|
| Clay Stabilizer (TMAC) | 2.0 |
| Gel Stabilizer (Sodium Thiosulfate) | 3.0 |
| Surfactant (Nonionic Ethoxylated Alcohol-based) | 2.0 |
| Crosslinker (TiLA) | 4.0 |

Figure 2:
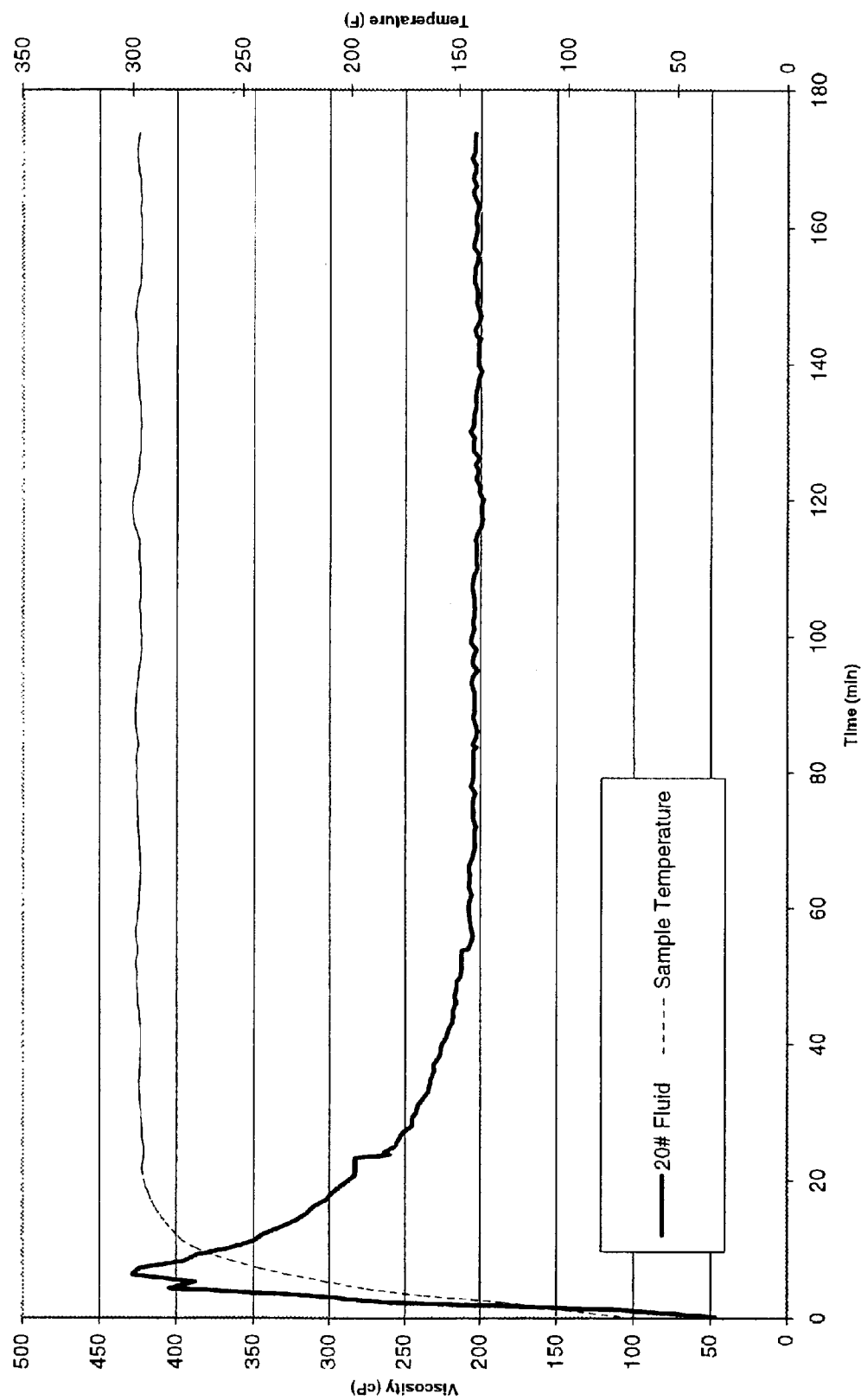
FIG. 2 is a chart showing a viscosity plot for a 20 lbm/1000 gal fracturing fluid.

A clay stabilizer (TMAC) was added first, followed by the gel stabilizer and surfactant. Finally, the crosslinker was added. Once the additive mixture was prepared, sufficient polymer emulsion was added, resulting in a polymer loading of 20 lbm/1000 gal. Following mixing for 3–4 minutes, a sample was taken and placed in Fann 50 viscometer at 300° F. The viscometry results are shown in FIG. 2. Upon reaching operating temperature (i.e., 300° F.) the fluid maintained a viscosity in the range of between approximately 400 cP and approximately 450 cP for over 160 minutes.

EXAMPLE 2

30# Fluid

Figure 3:
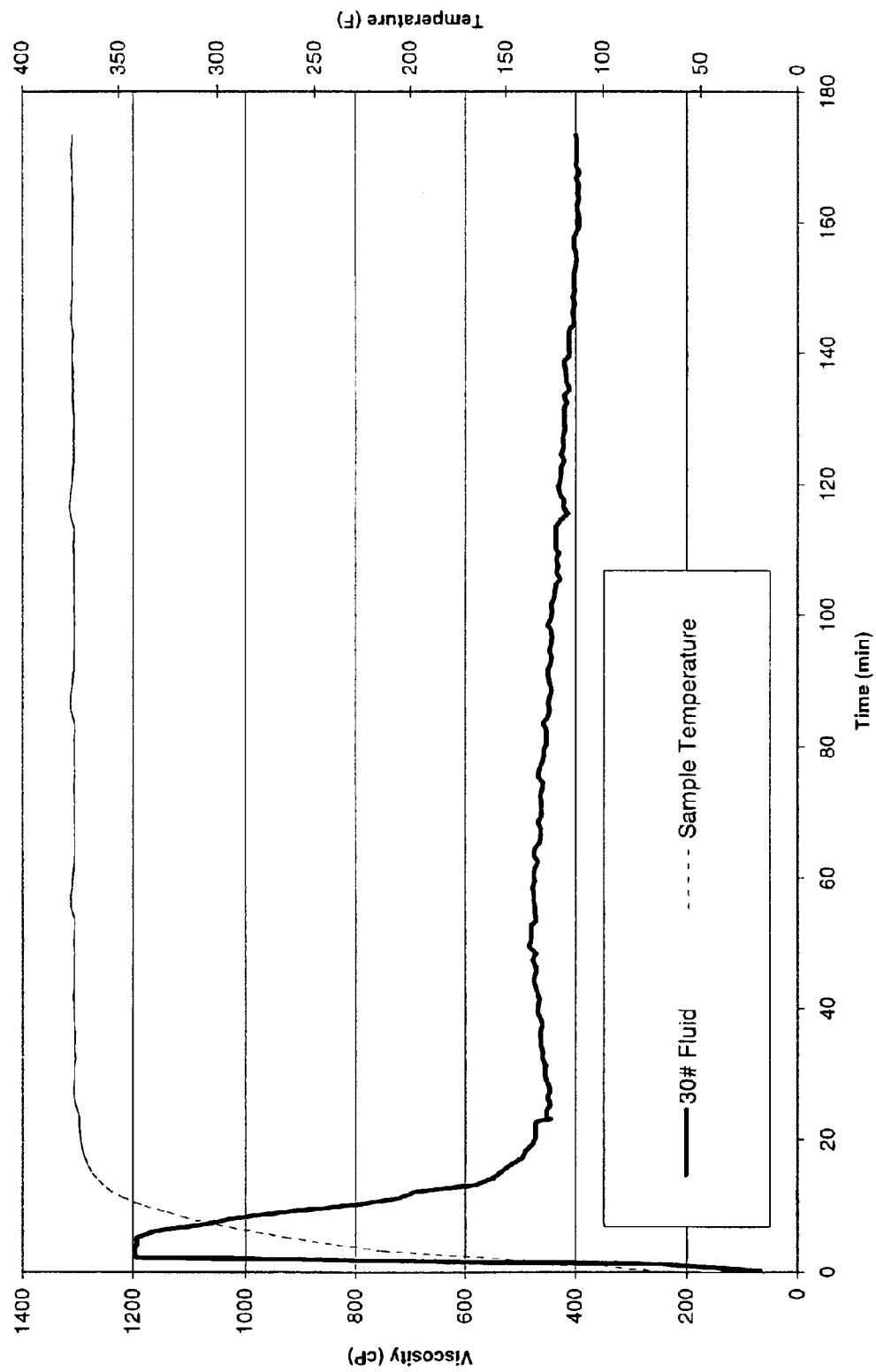
FIG. 3 is a chart showing a viscosity plot for a 30 lbm/1000 gal fracturing fluid.

FIG. 3 shows a viscosity plot of a fluid prepared using an additive mixture as described in Example 1. To the additive mixture, an acrylamide-based polymer emulsion was added to produce a fluid having a polymer concentration of approximately 30 lbm/1000 gal. Following mixing for 3–4 minutes, a sample was taken and placed in Fann 50 viscometer at 375° F. The viscometry results are shown in FIG. 3. Upon reaching operating temperature (i.e., 375° F.) the fluid maintained a viscosity in the range of approximately 400 cP for over 160 minutes.

EXAMPLE 3

50# Fluid

Figure 4:
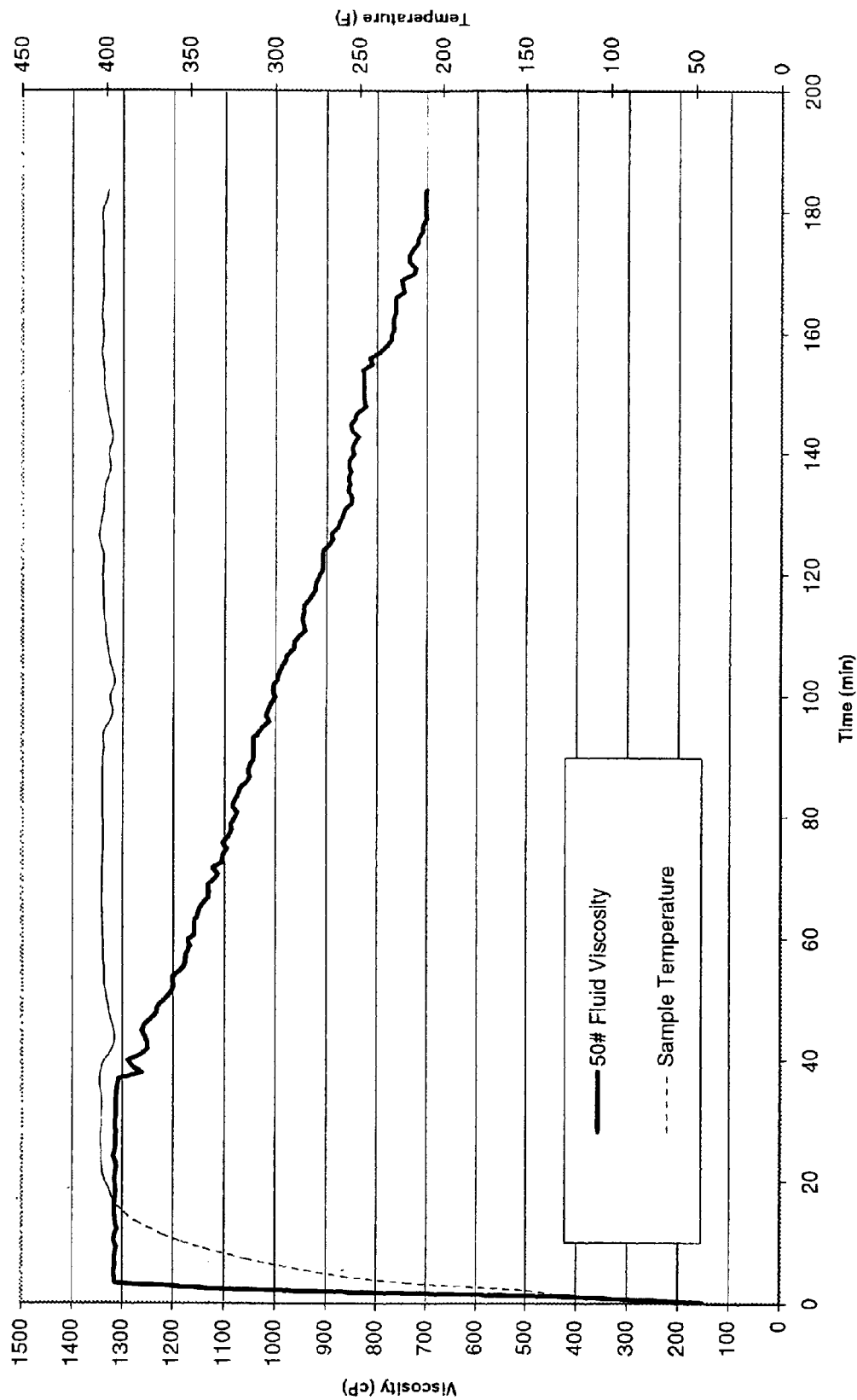
FIG. 4 is a chart showing a viscosity plot for a 50 lbm/1000 gal fracturing fluid.

FIG. 4 shows a viscosity plot of a fluid prepared using an additive mixture as described in Example 1. To the additive mixture, an acrylamide-based polymer emulsion was added, to produce a fluid having a polymer loading of approximately 50 lbm/1000 gal. Following mixing for 3–4 minutes, a sample was taken and placed in Fann 50 viscometer at 400° F. The viscometry results are shown in FIG. 3. Upon reaching operating temperature (i.e., 400° F.) the fluid maintained a viscosity in the range of greater than 700 cP for over 180 minutes.

EXAMPLE 4

30# Fluid with Acid

Figure 5:
FIG. 5 is a chart showing a viscosity plot for a 30 lbm/1000 gal fracturing fluid with acid.

As previously described, it may be desirable to include acid in the fluid prior to pumping the acid downhole. Preferably, the acid is added to the fluid after the polymer and the additive stream are combined. For instance, the acid may be added at the discharge side of the blender. The acid is thoroughly mixed or incorporated into the fluid. FIG. 5 shows the viscosity data for a fluid prepared by adding hydrocholoric acid to the fluid prior to taking samples for analysis.

EXAMPLE 5

40# Fluid with Acid

Figure 6:
FIG. 6 is a chart showing a viscosity plot for a 40 lbm/1000 gal fracturing fluid with acid.

FIG. 6 shows the viscosity of a fracturing fluid prepared according to Example 4, but having a polymer concentration of approximately 40 lbm/1000 gal. The fluid was subjected to a temperature of about 400° F. As can be seen from the graph, the viscosity of the fluid remained above 500 cP for over 170 minutes.

The preceding description of specific embodiments of the present invention is not intended to be a complete list of every possible embodiment of the invention. Persons skilled in this field will recognize that modifications can be made to the specific embodiments described here that would be within the scope of the present invention.

We claim:

1. A method for fracturing a subterranean formation comprising, in order, the steps of:
   (a) providing a water source;
   (b) adding a crosslinking agent to said water source;
   (c) adding a polymeric component to said water to create a fracturing fluid;
   (d) pumping said fracturing fluid into said formation.

2. The method of claim 1, further comprising the step of adding a surfactant to said water source prior to adding the polymeric component.

3. The method of claim 1, wherein said crosslinking agent contains titanium.

4. The method of claim 3, wherein said crosslinking agent is an organic titanate.

5. The method of claim 4, wherein said crosslinking agent is a titanium acetylacetonate.

6. The method of claim 4, wherein said crosslinking agent is dihydroxybis (ammonium lactate) titanium.

7. The method of claim 1, wherein said polymeric component is contains acrylamide.

8. The method of claim 7, wherein said polymeric component is an acrylamide-acrylate copolymer.

9. The method of claim 8, wherein said polymeric component is an acrylamide-sodium acrylate copolymer.

10. The method of claim 1, wherein said polymeric component is an anionic copolymer containing acrylamide.

11. The method of claim 1, further comprising the step of adding acid to said fracturing fluid prior to pumping the fluid into the formation.

12. The method of claim 1, further comprising the step of adding a proppant to said water stream.

13. The method of claim 12, wherein said proppant is added prior to step (b).

14. The method of claim 12, wherein said proppant is added simultaneously with step (c).

15. The method of claim 12, wherein said proppant is added subsequent to step (c).

16. The method of claim 12, wherein said proppant is a resin coated proppant.

17. The method of claim 12, further comprising the step of adding fibers.

18. The method of claim 1, further comprising the step of adding fibers.

19. The method of claim 18, wherein said fibers are organic.

20. The method of claim 18, wherein said fibers are inorganic.

21. A method for preparing a fracturing fluid comprising, in order, the steps of:

(a) providing a water stream;

(b) adding a titanium-based crosslinking agent into said water stream;

(c) adding a surfactant into said water stream;

(d) adding an acrylamide-based polymer to said stream to form a fracturing fluid.

22. A method for preparing a fracturing fluid comprising, in order, the steps of:

(a) providing a water stream;

(b) adding a surfactant into said water stream;

(c) adding a titanium-based crosslinking agent into said water stream;

(d) adding an acrylamide-based polymer to said stream to form a fracturing fluid.

23. A fracturing fluid having increased high temperature stability, said fluid prepared by a method comprising, in order, the steps of:

(a) providing a water source;

(b) adding a crosslinking agent to said water source;

(c) adding a polymeric component to said water to create a fracturing fluid;

(d) pumping said fracturing fluid into said formation.

24. The fluid of claim 23, wherein said fluid further comprises a proppant.

25. The fluid of claim 24, wherein said proppant is a resin coated proppant.

* * * * *